(12) United States Patent
Stewart

(10) Patent No.: US 9,882,729 B2
(45) Date of Patent: Jan. 30, 2018

(54) METHOD OF IDENTIFYING A POWERED DEVICE

(71) Applicant: Igor, Inc., Johnston, IA (US)

(72) Inventor: Dwight L. Stewart, Johnston, IA (US)

(73) Assignee: IGOR, INC., Johnston, IA (US)

( * ) Notice: Subject to any disclaimer, the term of this patent is extended or adjusted under 35 U.S.C. 154(b) by 74 days.

(21) Appl. No.: 14/679,623

(22) Filed: Apr. 6, 2015

(65) Prior Publication Data

US 2016/0294567 A1    Oct. 6, 2016

(51) Int. Cl.
*H04L 12/10* (2006.01)
*G06F 9/44* (2006.01)

(52) U.S. Cl.
CPC .................................. *H04L 12/10* (2013.01)

(58) Field of Classification Search
None
See application file for complete search history.

(56) References Cited

U.S. PATENT DOCUMENTS

| | | | | |
|---|---|---|---|---|
| 2009/0016517 | A1* | 1/2009 | Emmanuel | H04M 3/5116 379/207.12 |
| 2015/0304189 | A1* | 10/2015 | Barna | H04L 43/0811 709/224 |
| 2016/0205747 | A1* | 7/2016 | Verbrugh | H05B 37/0254 315/130 |

* cited by examiner

*Primary Examiner* — Paul Yanchus, III
(74) *Attorney, Agent, or Firm* — David M. Breiner; Brown Winick Law Firm

(57) ABSTRACT

In accordance with example embodiments, a system may include a computer having a database configured to store a list of unassigned devices and spaces, a network switch connected to the computer, and a plurality of unassigned devices connected to the network switch, wherein the computer is configured to cause one of the unassigned devices to generate a signal and then assign a space to the unassigned device based on input from a user. In accordance with example embodiments, a method may include detecting a plurality of devices in a network, storing a list of the devices in a database, causing one of the devices to generate a signal, and assigning the device that generated a signal to a space.

9 Claims, 10 Drawing Sheets

---

Creating a list of spaces and storing the list of spaces in an electronic database (2-1).

↓

Using a computer interface request a set space (2-2).

↓

Disconnecting and then reconnecting at least one device in a network (2-3).

↓

Assigning the at least one device to aset space (2-4).

FIG. 4

| Available Spaces | Unassigned Device | |
|---|---|---|
| S1 | 100 | ADD |
| S2 | 200 | ADD |
| S3 | 300 | ADD |
| S4 | 400 | ADD |
| S5 | 500 | ADD |
| | 600 | ADD |
| | 700 | ADD |
| | 800 | ADD |

FIG. 5A

| Available Spaces | Unassigned Device | |
|---|---|---|
| S1 | 100 | ADD |
| S2 | 200 | ADD |
| S3 | 300 | ADD |
| S4 | 400 | ADD |
| S5 | 500 | ADD |
|  | 600 | ADD |
|  | 700 | ADD |
|  | 800 | ADD |

FIG. 5B

| Available Spaces | Unassigned Device | |
|---|---|---|
| S1 | 100 | ADD |
| S2 | 200 | (ADD) |
| S3 | 300 | ADD |
| S4 | 400 | ADD |
| S5 | 500 | ADD |
|  | 600 | ADD |
|  | 700 | ADD |
|  | 800 | ADD |

FIG. 5C

| Available Spaces | Unassigned Device | |
|---|---|---|
| S1 | 100 | ADD |
| S2 | (200) | ADD |
| S3 | 300 | ADD |
| S4 | 400 | ADD |
| S5 | 500 | ADD |
|  | 600 | ADD |
|  | 700 | ADD |
|  | 800 | ADD |

FIG. 7

| Available Spaces | Unassigned Device | |
|---|---|---|
| 1 | 150 | ADD |
| 2 | 250 | ADD |
| 3 | 350 | ADD |
| | 450 | ADD |
| | 550 | ADD |
| | 650 | ADD |
| | 750 | ADD |
| | 850 | ADD |
| | 955 | ADD |

METHOD OF IDENTIFYING A POWERED DEVICE

BACKGROUND

1. Field

Example embodiments relate to method of identifying a powered device. Example embodiments also relate to a method of assigning the powered device to a space.

2. Description of the Related Art

Power over Ethernet (PoE) describes a system in which power and data are provided to a device via Ethernet cabling. FIG. 1, for example, illustrates a system 90 utilizing PoE. In FIG. 1 the system 90 includes three powered devices 50, 60, and 70 which may receive power and data from a switch 20. Typical examples of powered devices include IP cameras, IP telephones, wireless access points, switches, sensors, and light controllers. Though FIG. 1 shows only three powered devices 50, 60, and 70, it is understood the system 90 is usable to power and control only a single device, two devices, or more than three devices.

In the conventional art, the switch 20 may receive AC power and may distribute the power to a plurality of ports 25 to power the aforementioned devices. In FIG. 1, the switch 20 is illustrated as including twelve ports however it is understood that conventional switches 20 may include more than, or less than, twelve ports 25. Power from the ports 25 is delivered to the powered devices 50, 60, and 70 via conventional Ethernet cables 40.

In the conventional art, the switch 20 may include management software allowing the switch 20 to control how power is delivered to the powered devices 50, 60, and 70. For example, switch 20 may be configured to cycle power to the powered devices 50, 60, and 70. For example, in the event the devices 50, 60, and 70 are lights powered or controlled by the switch 20, the switch 20 may be configured to turn off the lights, or dim them, at times when they are not normally in use. In the alternative, the switch 20 may include a management port allowing an operator to configure the switch 20 or control the switch 20 to manage devices attached to the switch 20. For example, as shown in FIG. 1, the switch 20 may include a port allowing a user 10 to connect thereto to control the powered devices 50, 60, and 70 via the switch 20. In the conventional art, the switch 20 may alternatively be connected to a network which may be accessed by a user. In this latter embodiment, the user may have access to the switch 20, and may control the switch 20 via software that may run on the network or may run on a computer the user operates.

SUMMARY

Example embodiments relate to method of identifying a powered device. Example embodiments also relate to a method of assigning the powered device to a space.

In accordance with example embodiments a system may include a plurality of devices, a network switch configured to provide data and power to the plurality of devices, at least one electronic database configured to store a list of the devices and a list of spaces, a computer configured to assign at least one of the devices to at least one space based on a user input.

In accordance with example embodiments, a method of identifying a powered device may include storing a list of devices and spaces in an electronic database, receiving, at a computer, user input from an electronic interface, and using the computer to assign at least one of the devices to a space based on the user input.

BRIEF DESCRIPTION OF THE DRAWINGS

Example embodiments are described in detail below with reference to the attached drawing figures, wherein:

FIG. 4 is a display in accordance with example embodiments;
FIGS. 5A-5C illustrates views of a display in accordance with example embodiments;
FIG. 7 is a view of a display in accordance with example embodiments.

DETAILED DESCRIPTION

Figure 1:
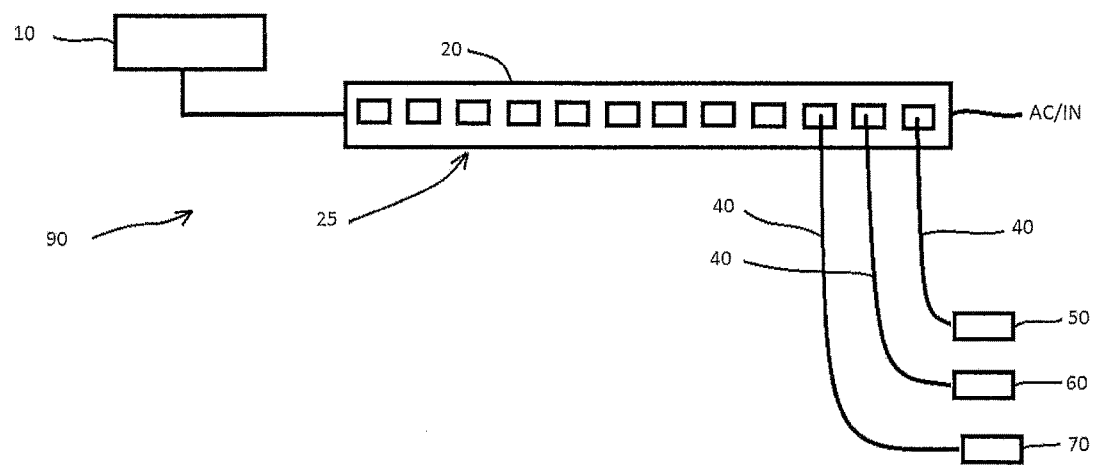
FIG. 1 is a view of a conventional system employing PoE.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to method of identifying a powered device and assigning the powered device to a space.

Figure 2:
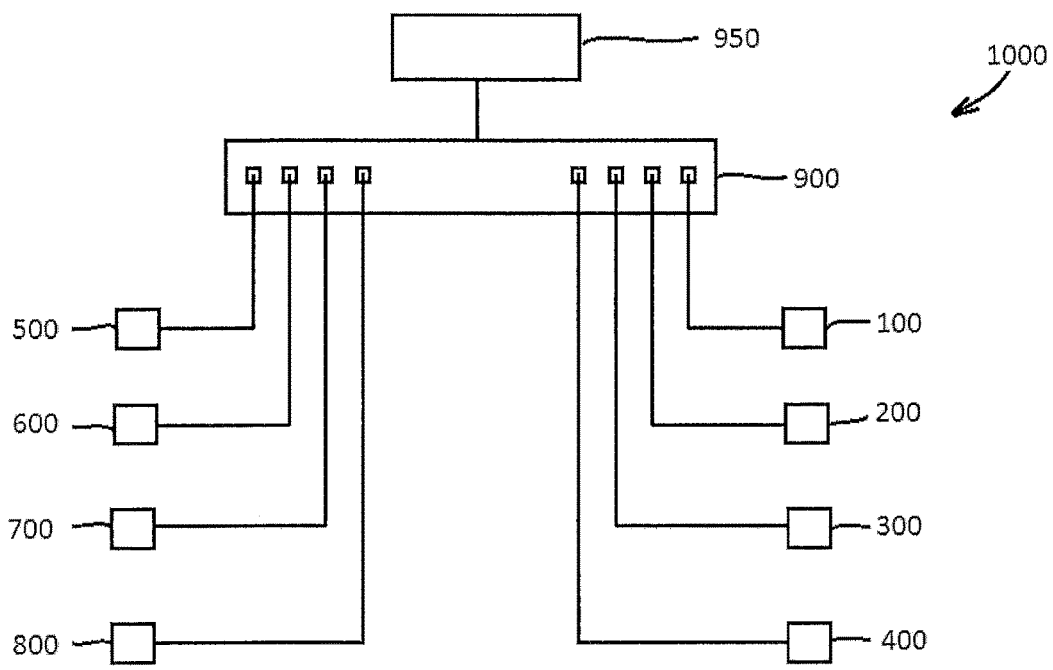
FIG. 2 is a view of a system in accordance with example embodiments.

FIG. 2 is a view of a system 1000 in accordance with example embodiments. As shown in FIG. 2, the system 1000 includes a computer 950, a network switch 900, and a plurality of powered devices 100, 200, 300, 400, 500, 600, 700, and 800 configured to receive power and data from the network switch 900. For example, power and data may be transferred from the network switch 900 to the powered devices 100, 200, 300, 400, 500, 600, 700, and 800 via PoE. For example, conventional Ethernet cables may transfer power and data from the network switch 900 to the powered devices 100, 200, 300, 400, 500, 600, 700, and 800. In this embodiment it is understood that the powered devices 100, 200, 300, 400, 500, 600, 700, and 800 may be, but are not required to be, devices such as, but not limited to, IP cameras, IP telephones, wireless access points, switches, sensors, lights, and light controllers.

In example embodiments, the computer 950 may send a discovery signal through the network switch 900 to each device 100, 200, 300, 400, 500, 600, 700, and 800 connected to the network switch 900. The computer 950 may be directly connected to the network switch 900 by conventional wiring or may be connected to the network switch 900 indirectly. For example, the computer 950 may be connected to a network which in turn is connected to the network switch 900. In the alternative, example embodiments also envision cloud based interaction between the computer 950 and the network switch 900. The devices 100, 200, 300, 400, 500, 600, 700, and 800 may return identifying information back to the computer 950 which may store the data in an electronic database. In example embodiments, while the computer 950 may learn of each of the components attached to the network switch 900, the computer 950 may be incapable of determining an actual location of the powered devices. As such, in example embodiments, the powered devices 100, 200, 300, 400, 500, 600, 700, and 800 may be given an unassigned status with regard to a space to which they are associated.

Figure 3A:
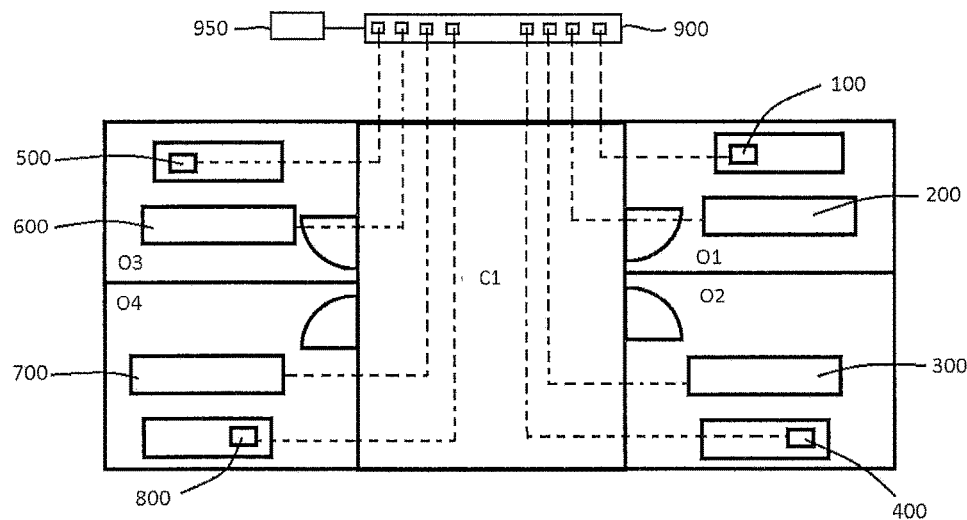
FIG. 3A is a view of a floor with a PoE system in accordance with example embodiments.

In example embodiments, the computer 950 may be encoded with software to help track, manage, and control the powered devices 100, 200, 300, 400, 500, 600, 700, and 800. For example, the computer 950 may be encoded with software which allows for the powered devices 100, 200, 300, 400, 500, 600, 700, and 800 to be controlled on a "space" basis. For example, in example embodiments spaces, for example, virtual spaces, may be created and stored in a database. These spaces may correspond to physical spaces associated with the powered devices 100, 200, 300, 400, 500, 600, 700, and 800. For example, as shown in FIG. 3A, a floor in an office building may include four offices O1, O2, O3, O4 and a common area C1. The first and second powered devices 100 and 200 may be in Office O1, the second and third powered devices 300 and 400 may be in the second Office O2, the fifth and sixth powered devices 500 and 600 may be in the third office O3, and the seventh and eighth powered devices 700 and 800 may be in the fourth Office O4.

Figure 3B:
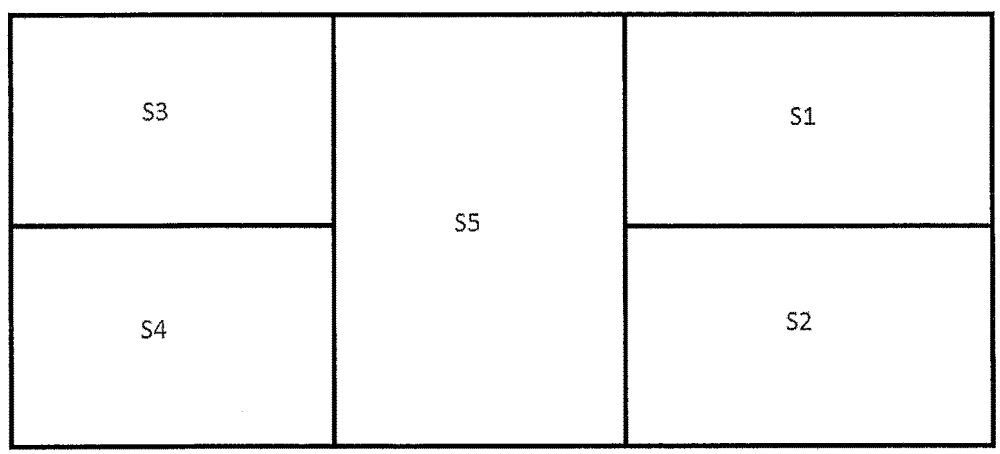
FIG. 3B is an example view of spaces associated with a physical floor.

In example embodiments, the software may be configured to create and/or store "spaces" (which may be virtual spaces) that correspond to various physical spaces. For example, FIG. 3B illustrates five spaces S1, S2, S3, S4, and S5 associated with the above mentioned floor where space S1 may correspond to Office O1, space S2 may correspond to office O2, space S3 may correspond to office O3, space S4 may correspond to O4, and space S5 may correspond to common area C1. In example embodiments, the software may store the spaces S1, S2, S3, S4, and S5 in a database. Although FIG. 3B illustrates five spaces S1, S2, S3, S4, and S5 having a one-to-one correspondence with the four offices O1, O2, O3, and O4 and commons area C1 this is not intended to limit the invention. For example, the first space S1 could correspond to both of the first and second offices O1 and O2 combined together.

As mentioned above, the computer 950 may send a discovery signal to each of the powered devices 100, 200, 300, 400, 500, 600, 700, and 800 to detect and/or discover each device connected to the switch 900. In example embodiments, the software loaded on the computer 950 may create a list of unassigned devices connected to the network switch 900 and may store the list of these devices in an electronic database. However, as mentioned above, the software may not know what powered devices in a physical space are associated with a virtual space S1, S2, S3, S4, and S5. In other words, the software may have a list of spaces S1, S2, S3, S4, and S5 and a list of powered devices 100, 200, 300, 400, 500, 600, 700, and 800, but may not know which powered device belongs in a particular space. Powered devices which are not assigned to a space are referred to as unassigned devices.

Example embodiments include a variety of methods for identifying an unassigned powered device and assigning the unassigned powered device to a space. For example, in one nonlimiting example embodiment, an operator may transport a computer interface, for example, a laptop computer, an i-pad or an i-phone, to an area where the unassigned devices are located. The computer interface may be configured to communicate with the computer 950, either directly or indirectly, and may display data associated with the spaces and the unassigned devices. In example embodiments, the computer interface may receive the data from the computer 950 or may have access to data stored by the computer 950. Regardless, in example embodiments, the computer interface may simultaneously display a list of the unassigned devices and available spaces. For example, as shown in FIG. 4, the interface may include a screen showing the spaces S1, S2, S3, S4, and S5 may show along with a list of unassigned devices 100, 200, 300, 400, 500, 600, 700, and 800.

In example embodiments, the list of unassigned devices, for example, may be augmented with an "ADD" button which may be arranged adjacent the unassigned devices and displayed on the computer interface. In example embodiments, if a user were to press the "ADD" button adjacent an unassigned device a signal may be sent to the computer 950. The computer 950, in turn, may cause a signal to be sent to the unassigned device associated with the "ADD" button to cause the unassigned device to generate a signal which would allow the operator to identify the unassigned device. For example, in the event the unassigned device were a light, the light may turn on, blink, or change colors. In the event the unassigned device was a phone, the phone may ring or generate some other noise. Once the unassigned device is located, a user may assign the unassigned device to its proper space. For example, in an embodiment wherein the interface is a touch screen, a user may simply touch an icon associated with the powered device and drag this icon to the desired space to assign the powered device to the space.

Figure 8:
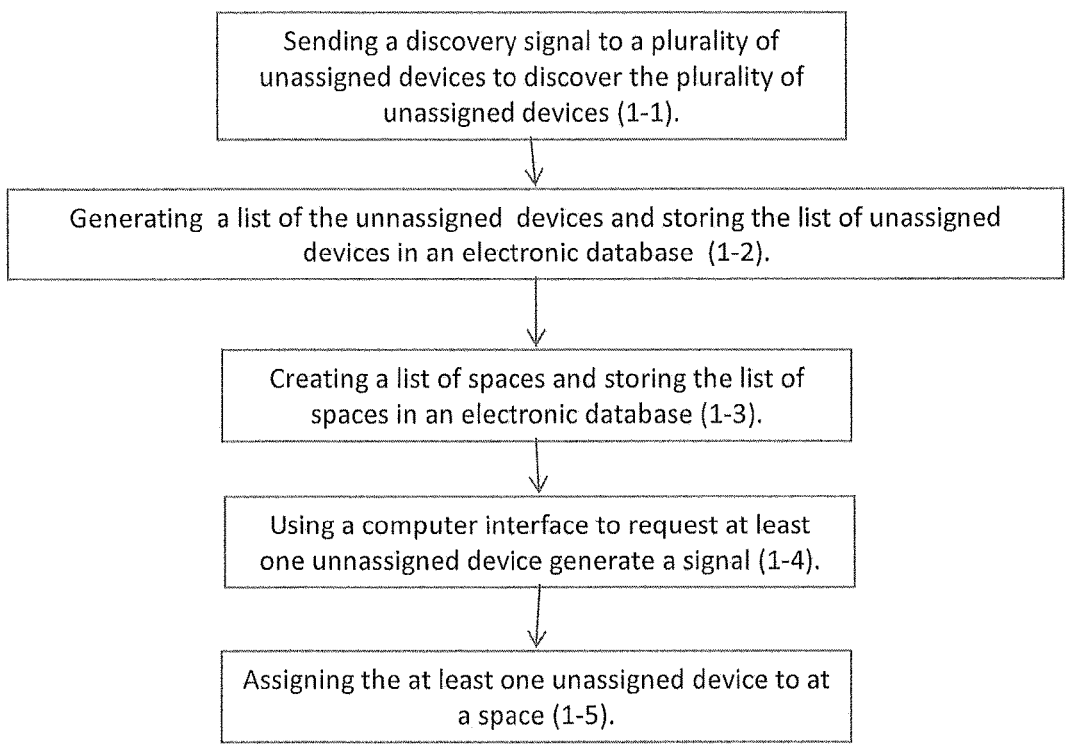
FIG. 8 is a view of a method in accordance with example embodiments.

For focus, the case of FIGS. 5A-5C are considered. In the example of FIGS. 5A-5C the layout of FIGS. 3A and 3B is assumed. It is also assumed that the computer 950 has already sent out a discovery signal and that all of the devices 100, 200, 300, 400, 500, 600, 700, and 800 have been detected. It is further assumed that the list of devices 100, 200, 300, 400, 500, 600, 700, and 800 is stored in an electronic database and that another list of spaces S1, S2, S3, S4, and S5 has also been stored in an electronic database (which may be, but not required to be, in the same database storing the list of unidentified devices). In this particular example, an operator is at the office floor with the previously described interface. In order to identify and assign one of the devices 100, 200, 300, 400, 500, 600, 700, and 800 to a proper space the operator may pull up the list of spaces S1, S2, S3, S4, and S5 along with the list of unassigned devices 100, 200, 300, 400, 500, 600, 700, and 800 and this information may be displayed on a display screen of the interface. An example of this information is displayed as FIG. 5A. In example embodiments, if the user wanted to locate the unassigned device 200 and then assign this device 200 to a space the user may simply press an icon associated with unassigned device 200, for example, the ADD button next to the icon for device 200 illustrated in FIG. 5A. The ellipse illustrated in FIG. 5B illustrates the ADD button selected by the user. In example embodiments, this action may cause a signal be sent to the computer 950 and the computer 950 cause the device 200 to generate a signal to allow the operator to identify the device 200. The operator may observe that this device 200 is located in office O1 which corresponds to space S1. To assign this device to space S1, the user may simply press the device number 200 and drag this number across the display screen to the S1 icon as illustrated in FIG. 5C. This action may cause the device 200 to be assigned to space S1 by sending another signal to the computer 950 to make such an assignment. This process may be repeated until each of the devices are assigned to a space. An example of this process is illustrated in FIG. 8.

Figure 6:
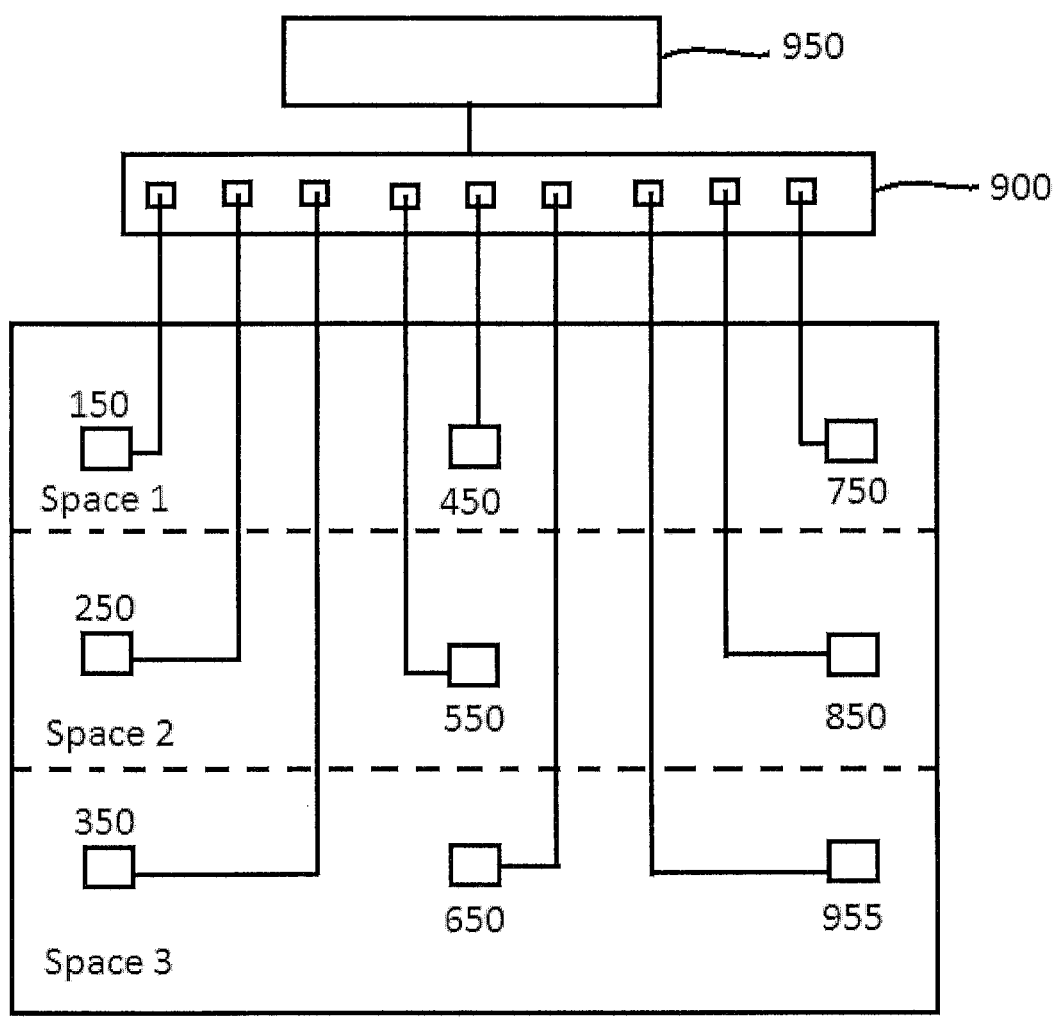
FIG. 6 is a view of a system in accordance with example embodiments.

As another example, FIG. 6 is a view of a plurality of powered devices 150, 250, 350, 450, 550, 650, 750, 850, and 955 arranged in a relatively large area that is partitioned into three spaces, Space 1, Space 2, and Space 3. Consistent with the above example, the powered devices 150, 250, 350, 450, 550, 650, 750, 850, and 955 may receive both power and data from the network switch 900 which may be controlled by a computer 950. As in the above example, the computer 950 may send a discovery signal to each of the powered devices 150, 250, 350, 450, 550, 650, 750, 850, and 955 attached to the network switch 900. The computer 950 may then receive identifying information regarding each powered device and may store this data in a table. As for the instant example, the table may resemble FIG. 7. In example embodiments, a user may display the list of powered devices 150, 250, 350, 450, 550, 650, 750, 850, and 955 on a computer interface. If the user were to select the ADD button adjacent the unassigned device 150, the computer 950 may cause the unassigned device 150 to generate a signal, for example, a blinking light and/or a noise, which would allow a user to identify the unassigned device 150. As such, the user would observe that this device should be assigned to Space 1 and would then add this device to a list of devices associated with Space 1. If the user were to select the ADD button adjacent the unassigned device 250, the unassigned device 250 would also generate a signal which would allow the user to identify the unassigned device 250. As such, the user would observe that this device should be assigned to Space 2 and would then add this device to a list of devices associated with Space 2. This process may be repeated until all unassigned devices are assigned to a space.

Although example embodiments illustrate a list of unassigned devices being associated with an ADD button, this is not intended to be a limiting feature of the invention. For example, rather than pressing an ADD button, any icon associated with the unassigned device may be selected in order to activate the unassigned device. The icon, for example, may be automatically generated if a cursor is moved over an unassigned device. Regardless, in example embodiments, in order to identify an unassigned device, a user may cause a signal be sent to the unassigned device to cause the unassigned device to generate a signal observable by the user, for example, to generate a blinking light, a color, or a noise.

Figure 9:
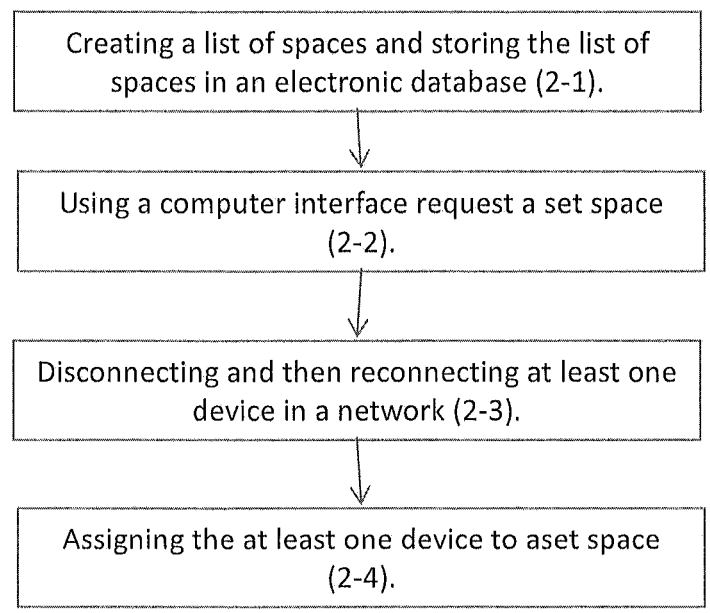
FIG. 9 is a view of a method in accordance with example embodiments.

The invention is not intended to be limited by the aforementioned process. For example, in another embodiment of assigning a powered device to a space the software on the computer 950 may operate in a different manner. In one embodiment the user interface may be configured to send a signal to the computer 950 informing the computer 950 which space the operator is working in (in this application, a set space). For example, referring to FIG. 6, if an operator were working in Space 1 an operator may send a signal to computer 950 to inform the computer 950 he/she is in Space 1. In this particular embodiment, the operator may simply disconnect and reconnect each of the powered devices 150, 450, and 750 in Space 1. In doing so the powered devices 150, 450, and 750 may send a signal to the switch 900 upon reconnection and this signal may be used by the computer 950, along with the previous signal sent by the operator, to assign these powered devices to Space 1. In the event the operator wished to have the devices in Space 2 assigned to Space 2, the operator would send another signal to the computer 950 alerting the computer the operator was in Space 2. After this signal is sent, the operator may then disconnect and reconnect each of the powered devices 250, 550, and 850. As in the previous example, the reconnection of the powered devices 250, 550, and 850 may cause a signal to be sent to the switch 900 and this signal may be used by computer 950 to assign each of the powered devices 250, 550, and 850 to Space 2. This process may be repeated until all of the unassigned devices are assigned. FIG. 9 is a flowchart illustrating an example of this method.

Figure 10:
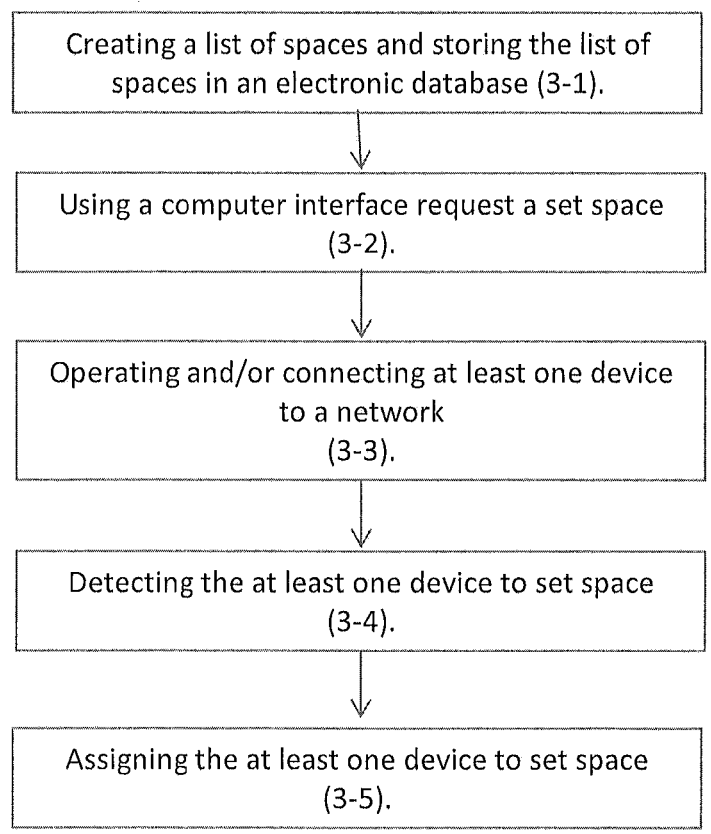
FIG. 10 is a view of a method in accordance with example embodiments.

Example embodiments, however, are still not limited by the above examples. For example, in another embodiment of assigning a powered device to a space the software on the computer 950 may operate in yet another manner. In this particular embodiment the user interface may be configured to send a signal to the computer 950 informing the computer 950 which space the operator is working in (in this application, a set space). For example, referring to FIG. 6, if an operator were working in Space 1 an operator may send a signal to computer 950 to inform the computer 950 he/she is in Space 1. In this particular embodiment, the operator may simply activate and/or deactivate each of the powered devices 150, 450, and 750 in Space 1 (for example, by turning on/off each of the powered devices 150, 450, and 750). In doing the network switch 900 may detect that the powered devices 150, 450, and 750 are being operated and the network switch 900 may send a signal to the computer 950 and this signal may be used by the computer 950, along with the previous signal sent by the operator, to assign these powered devices to Space 1. For example, in this latter example, the powered devices may send a signal to the network computer 950 via the network switch 900 when they are turned on. In the event the operator wished to have the devices in Space 2 assigned to Space 2, the operator may send another signal to the computer 950 alerting the computer the operator was now in Space 2. After this signal is sent, the operator may then turn on/off each of the powered devices 250, 550, and 850. As in the previous example, the network switch 900 may detect the powered devices 250, 550, and 850 were turned on and/or off which may cause a signal to be sent to the computer 950 and this signal may be used by computer 950 to assign each of the powered devices 250, 550, and 850 to Space 2. For example, in this latter example, the powered devices 250 and 550 may send a signal to the network switch 900 when they are turned on and the network switch 900 may detect these signals. In response, the network switch may simply send a signal to the computer 950 informing it powered devices 250 and 550 have been activated. This process may be repeated until all of the unassigned devices are assigned. An example of this method is illustrated in FIG. 10.

Thus far example embodiments have provided several methods of identifying an unassigned device and assigning the unassigned device to a space. In example embodiments, devices assigned to a space may be, but are not required to be, controlled on a group level. For example, in example embodiments, the computer 950 may be loaded with software which allows powered devices to be controlled on a group level. For example, FIG. 6 may represent a floor of a warehouse. In this particular nonlimiting example embodiment, the area associated with Space 3 may not be used at night and therefore each of the powered devices 350, 650, and 955 may be controlled by the computer 950 so that they are either shut off or dimmed at night. Conversely, it may be determined that the powered devices 150, 450, and 750 of Space 1 are constantly utilized. As such, the computer 950 may control these devices, or any other device in Space 1, to always remain on.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

I claim:

1. A system comprising:
   a plurality of devices;
   a network switch configured to provide data and power to the plurality of devices;
   at least one electronic database configured to store a list of the devices and a list of spaces;
   a portable user interface configured to send a first signal, the first signal including information indicative of a set space to which devices will be assigned; and
   a computer configured to receive the first signal and a second signal from at least one of the devices and assign the at least one of the devices to the set space, the second signal including device identification information for the at least one of the devices, wherein the second signal is sent in response to the at least one of the devices connecting to the network switch, being activated, or reconnecting to the network switch, wherein with respect to the computer, the at least one of the devices communicates in parallel with the portable user interface.

2. The system of claim 1, wherein the computer is configured to cause one of the devices to generate a signal in response to a signal and then assign the device to a space based on input from a user.

3. The system of claim 2, wherein the portable user interface is an electronic interface configured to operate remotely from the computer, wherein the electronic interface is configured to send a signal to the computer and the computer is configured to use the signal to activate the one of the unassigned devices to generate the signal.

4. The system of claim 3, wherein the interface includes a display screen configured to display data for the spaces and the devices.

5. The system of claim 4, wherein the display screen is a touch screen and the interface sends the first signal to the computer in response to an image on the display screen being touched.

6. The system of claim 1, wherein the portable user interface is an electronic interface operated remotely from the computer, wherein the electronic interface sends user input to the computer.

7. The system of claim 1, wherein the computer is configured to control at least one of the devices based on a space to which the at least one of the devices is assigned.

8. The system of claim 1, wherein the at least one powered device includes a light.

9. The system of claim 1, wherein the second signal including the device identification information for the at least one of the devices does not have different device information linked together.

* * * * *